UNITED STATES PATENT OFFICE.

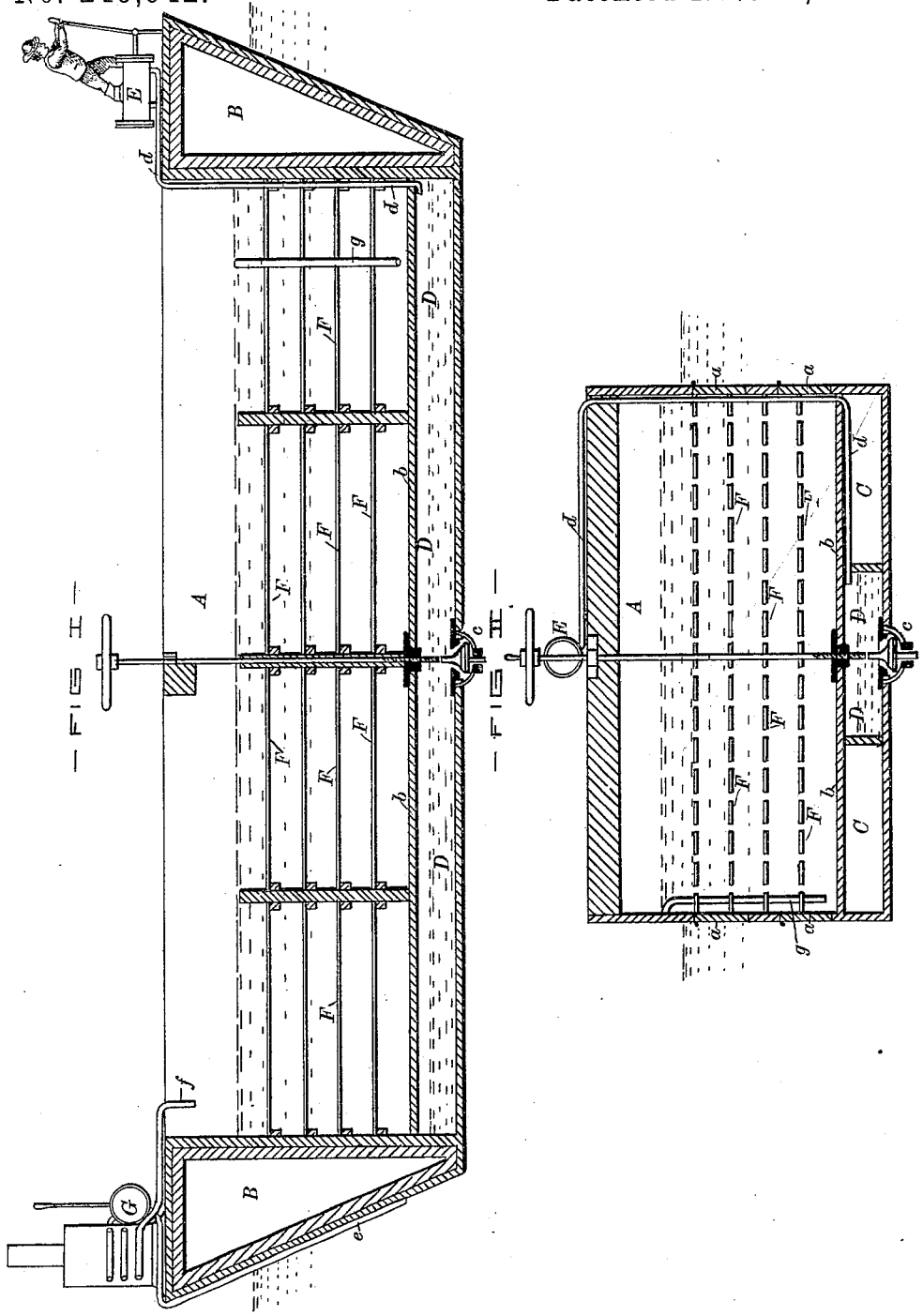

VINCEN N. HUGHES, OF BALTIMORE, MARYLAND, ASSIGNOR OF ONE-THIRD TO JOSEPH FRANCE, OF SAME PLACE.

OYSTER-FATTENING APPARATUS.

SPECIFICATION forming part of Letters Patent No. 249,942, dated November 22, 1881.

Application filed September 1, 1881. (No model.)

*To all whom it may concern:*

Be it known that I, VINCEN N. HUGHES, of the city of Baltimore and State of Maryland, have invented certain Improvements in Apparatus for Fattening Oysters, of which the following is a specification.

This invention relates to improved means for fattening oysters after their removal from the oyster-beds.

To fully understand the nature of this invention, it may be proper to state that where oysters in bulk are immersed in water in the fattening process those on or near to the surface of the heap or mass are fattened, while the others, or those near to the bottom of the heap, owing to the weight of the oysters above them, are not improved in condition; further, it is found that the fattening process is facilitated by using water of an even temperature and one considerably higher than that of the water from which the oysters are taken in the winter months.

My invention, therefore, briefly stated, consists in a vessel adapted to hold oysters in separated layers, with means for supplying the same with water, the temperature of which is increased by means of suitable apparatus, the said vessel having devices for effecting the proper circulation of water throughout the mass of oysters to be fattened, and others for elevating and depressing it when the same is adapted as a float in the sustaining water, as will hereinafter appear.

In carrying out my invention, I provide a scow or float, adapted for elevation or depression, to raise the oysters from or submerge them in a body of water, with separating slats or strips, upon and between which the oysters to be fattened are placed; and I combine with the said vessel supply and discharge pipes and valves and apparatus for heating the said water before its introduction to the interior of the vessel.

In the further description of my said invention, which follows, reference is made to the accompanying drawings, forming a part hereof, and in which—

Figure I is a longitudinal section of my improved oyster-fattening apparatus, and Fig. II a transverse section of the same.

Similar letters of reference indicate similar parts in both the views.

A is a scow, having suitable doors $a$ at its sides, adapted to be opened and closed for purposes hereinafter described.

B B are air-chambers, situated preferably at the ends of the scow, as shown in Fig. I of the drawings.

C C are air-chambers, extending longitudinally of the scow and exteriorly of the bottom $b$ of the same. These air-chambers are connected with the ones B or separated from them, as may be preferred.

D is a central chamber, also extending longitudinally of the scow, adapted to be supplied with either water or air, as may be necessary to effect a greater or less depth of immersion of the scow. With this view the said chamber is provided with a valve, $c$, and suitable mechanism for controlling it, whereby water is admitted to the said chamber, and also with an air-pipe, $d$, leading to an air-pump, E, through which air is forced by hand or steam power to displace the water in said chamber when the scow is to be elevated. It will be understood that when the scow is to be immersed to a greater depth water is admitted to the chamber D by means of the valve $c$, and when to be raised or elevated air is pumped into the chamber and the water displaced, the valve being opened to allow of its exit.

F F are removable strips or slats, supported at preferably equal distances apart in the interior of the scow to support and separate the heap or mass of oysters into isolated layers of, say, ten inches in thickness.

During the summer months, when the water is at a proper temperature to fatten the oysters, the doors $a$ are opened and water allowed to flow from the exterior of the scow to the oysters and be discharged through the doors. A pump may, however, be used, as shown in the drawings. This latter method is thought to be a more advantageous one, as a better circulation of water is effected.

The pump used to supply the oysters with fresh water is indicated by G, and the supply and delivery pipes for the pump respectively by e and f. An overflow-pipe, g, maintains a regular depth of water in the scow. When the exterior water is colder than what is thought proper for the fattening process the supply is heated by passing the pipe, which is in the form of a coil or gang, through a boiler or stove. The hot water can be supplied directly from a boiler, if preferred.

It is evident that if the scow is to be used exclusively during the summer months an open scow or one without sides could be employed, instead of one provided with doors, as shown.

In the foregoing description the vessel containing the oysters has been referred to as a scow or vessel adapted for floatation; but I do not limit myself to an apparatus of this kind. A tight tank can be employed on land and the oysters transferred thereto from vessels, and in this case the water-supply would come from a source other than that above referred to.

It will be seen by reference to the drawings that the pipe supplying the scow with water and the overflow-discharge are at opposite ends of the vessel. The object of this arrangement is to equalize the temperature of water in all parts of the vessel.

It will be understood that the object of the air-chambers B is to give proper sustaining power to the apparatus in view of the increased bulk of oysters contained in the scow.

I claim as my invention—

1. In an oyster-fattening apparatus, a scow or vessel having air-chambers at its sides or ends and a chamber adapted to be supplied with water, combined with means for forcing air into the said chamber to displace the water contained therein, substantially as and for the purpose specified.

2. In an oyster-fattening apparatus, a scow or vessel having air-chambers at its ends and a chamber situated below the oysters contained in the said vessel, provided with a valve-opening in communication with the water exterior of the vessel, means for controlling the valve for the said opening, and an air-pump with suitable pipes, whereby the said chamber may be filled with air and the water therein displaced, substantially as and for the purpose specified.

3. In an oyster-fattening apparatus, a scow or vessel for holding oysters in the shell, in bulk, in separate layers, a pump for supplying the said vessel with water, and suitable inlet and outlet water-pipes, combined with a boiler or stove for heating the supply-water, substantially as and for the purpose specified.

VINCEN N. HUGHES.

Witnesses:
J. D. HOWARD,
WM. T. HOWARD.